US010027112B2

(12) United States Patent
Krstic

(10) Patent No.: US 10,027,112 B2
(45) Date of Patent: Jul. 17, 2018

(54) HIGH VOLTAGE POWER SUPPLIES USING SERIALLY COUPLED CURRENT SOURCE RECTIFIERS AND METHODS OF OPERATING THE SAME

(71) Applicant: Eaton Corporation, Cleveland, OH (US)

(72) Inventor: Slobodan Krstic, Brookfield, WI (US)

(73) Assignee: Eaton Intelligent Power Limited, Dublin (IE)

( * ) Notice: Subject to any disclaimer, the term of this patent is extended or adjusted under 35 U.S.C. 154(b) by 455 days.

(21) Appl. No.: 14/748,963

(22) Filed: Jun. 24, 2015

(65) Prior Publication Data

US 2016/0380429 A1 Dec. 29, 2016

(51) Int. Cl.
| | | |
|---|---|---|
| H02J 1/00 | (2006.01) | |
| H02H 7/125 | (2006.01) | |
| H02M 1/00 | (2006.01) | |
| H02M 7/25 | (2006.01) | |
| H02J 3/36 | (2006.01) | |
| H02M 7/219 | (2006.01) | |

(52) U.S. Cl.
CPC .............. *H02J 1/00* (2013.01); *H02H 7/125* (2013.01); *H02J 3/36* (2013.01); *H02M 7/219* (2013.01); *H02M 7/25* (2013.01); *H02M 2001/0077* (2013.01); *Y02E 60/60* (2013.01)

(58) Field of Classification Search
CPC ...... H02J 3/36; H02J 1/00; H02M 2001/0077; H02M 7/219; H02M 7/25; Y02E 60/60; Y10T 307/707; H02H 7/125
See application file for complete search history.

(56) References Cited

U.S. PATENT DOCUMENTS

| | | | | |
|---|---|---|---|---|
| 9,209,679 B2 * | 12/2015 | Sastry | ................. | H02M 1/4233 |
| 9,515,565 B2 * | 12/2016 | Gupta | ................. | H02M 5/4585 |
| 2008/0284249 A1 | 11/2008 | Datta et al. | | |
| 2013/0187473 A1 | 7/2013 | Deboy et al. | | |
| 2013/0197704 A1 | 8/2013 | Pan et al. | | |
| 2015/0171663 A1 | 6/2015 | Krstic et al. | | |

FOREIGN PATENT DOCUMENTS

EP      1 931 021 A2     6/2008

OTHER PUBLICATIONS

Popat, Miteshkumar, Bin Wu, and Navid Zargari. "Fault ride-through of PMSG-based offshore wind farm connected through cascaded current source converter-based HVDC." Power Electronics and Machines in Wind Applications (PEMWA), 2012 IEEE. IEEE, 2012.*

(Continued)

*Primary Examiner* — Ryan Johnson

(74) *Attorney, Agent, or Firm* — Ward and Smith, P.A.

(57) ABSTRACT

An apparatus includes an output port configured to be coupled to a load, a plurality of current source rectifier (CSR) circuits having outputs coupled in series across the output port, and a control circuit configured to control the CSR circuits responsive to a voltage at the output port. The quantity of CSR circuits may be sufficient to provide redundancy in the event one or more of the CSR circuits fails.

16 Claims, 6 Drawing Sheets

(56) References Cited

OTHER PUBLICATIONS

Kranz et al. *Implementation of Sine-Wave Input/Output BLDC Inverter for Low Inductance Shipboard PM Motor Drives using Modular Power Platform;* IEEE, (2011) pp. 46-51.
International Search Report and Written Opinion Corresponding to International Application No. PCT/US2016/037773, dated Oct. 25, 2016; 13 Pages.
Notification Concerning Transmittal of International Preliminary Report on Patentability, Corresponding to International Application No. PCT/US2016/037773, dated Jan. 4, 2018; 10 Pages.

* cited by examiner

HIGH VOLTAGE POWER SUPPLIES USING SERIALLY COUPLED CURRENT SOURCE RECTIFIERS AND METHODS OF OPERATING THE SAME

BACKGROUND

The inventive subject matter relates to power supply apparatus and methods, more particularly, to AC/DC converter apparatus and systems and methods employing the same.

In many applications, DC power distribution systems offer several potential advantages over AC power distribution systems. For example, HVDC transmission lines are sometimes used for long distance power transmission applications because DC lines generally have lower losses from line capacitance and skin effect. HVDC lines may also be used to interconnect unsynchronized AC systems. In undersea applications, DC transmission systems may have lower losses in transferring power from power sources that are far removed from subsea loads. Medium voltage DC power systems are also finding increased use in shipboard power distribution, where DC power distribution lines may be an extension of DC links of electric propulsion and thruster drives, and can facilitate connection of batteries and other storage devices. Converters used in a DC power distribution system can provide means to further optimize efficiency by providing greater control of power flows. DC power distribution systems are often fed by power converters that are used to interface the DC system to an AC source, such as a generator or AC power grid.

Current source rectifiers (CSRs) are may be used to generate a DC output from an AC source. A CSR is a single-stage converter whose DC output can be current limited by proper control of switching transistors of the current source rectifier. An example of an application of CSR to an uninterruptible power supply is described in United States Patent Application Publication No. 2015/0171663 entitled "UNINTERRUPTIBLE POWER SYSTEMS USING SOURCE RECTIFIERS AND METHODS OF OPERATING THE SAME", incorporated by reference herein in its entirety. Another example of the use of current source rectifiers is provided in a paper entitled "Implementation of Sine-Wave Input/Output BLDC Inverter for Low Inductance Shipboard PM Motor Drives using Modular Power Platform", Kranz et al., *IEEE Electric Ship Technologies Forum* (2011) pp. 46-51.

SUMMARY

Some embodiments of the inventive subject matter provide an apparatus including an output port configured to be coupled to a load, a plurality of current source rectifier (CSR) circuits having outputs coupled in series across the output port, and a control circuit configured to control the CSR circuits responsive to a voltage at the output port.

In some embodiments, the control circuit includes a master controller configured to generate a plurality of voltage control signals responsive to the voltage at the output port. The control circuit may further include a plurality of local controllers configured to control respective ones of the CSR circuits responsive to respective ones of the voltage control signals. The voltage control signals may represent desired output voltages for the respective CSR circuits. The desired output voltages represented by the voltage control signals may correspond to a desired level for the voltage at the output divided by a quantity of the CSR circuits serving a load coupled to the output port. In some embodiments the master controller may be configured to sense a failure of a CSR circuit and to responsively bypass the failed CSR circuit and adjust output voltages of remaining active ones of the CSR circuits to maintain a desired output voltage at the output port. The local controllers may be configured to be powered at respective voltages applied to inputs of the associated CSR circuits.

In further embodiments, inputs of the CSR circuits are isolated from one another. For example, the apparatus may further include a transformer having a primary winding configured to be coupled to an AC power source and a plurality of second windings, respective ones of which are coupled to respective ones of the inputs of the CSR circuits.

Further embodiments of the inventive subject matter provide a power distribution system including at least one DC power distribution bus configured to provide power to at least one load. A power converter is an output port coupled to the at least one DC power distribution bus. The power converter includes a plurality of CSR circuits having outputs coupled in series across the output port.

Still further embodiments of the inventive subject matter provide methods including coupling outputs of a plurality of CSR circuits in series across a load and controlling the CSR circuits responsive to a voltage across the serial coupled outputs of the CSR circuits. The quantity of the CSR circuit may provide redundancy sufficient to maintain the load in the event of deactivation of at least one of the CSR circuits.

DETAILED DESCRIPTION

Figure 1:
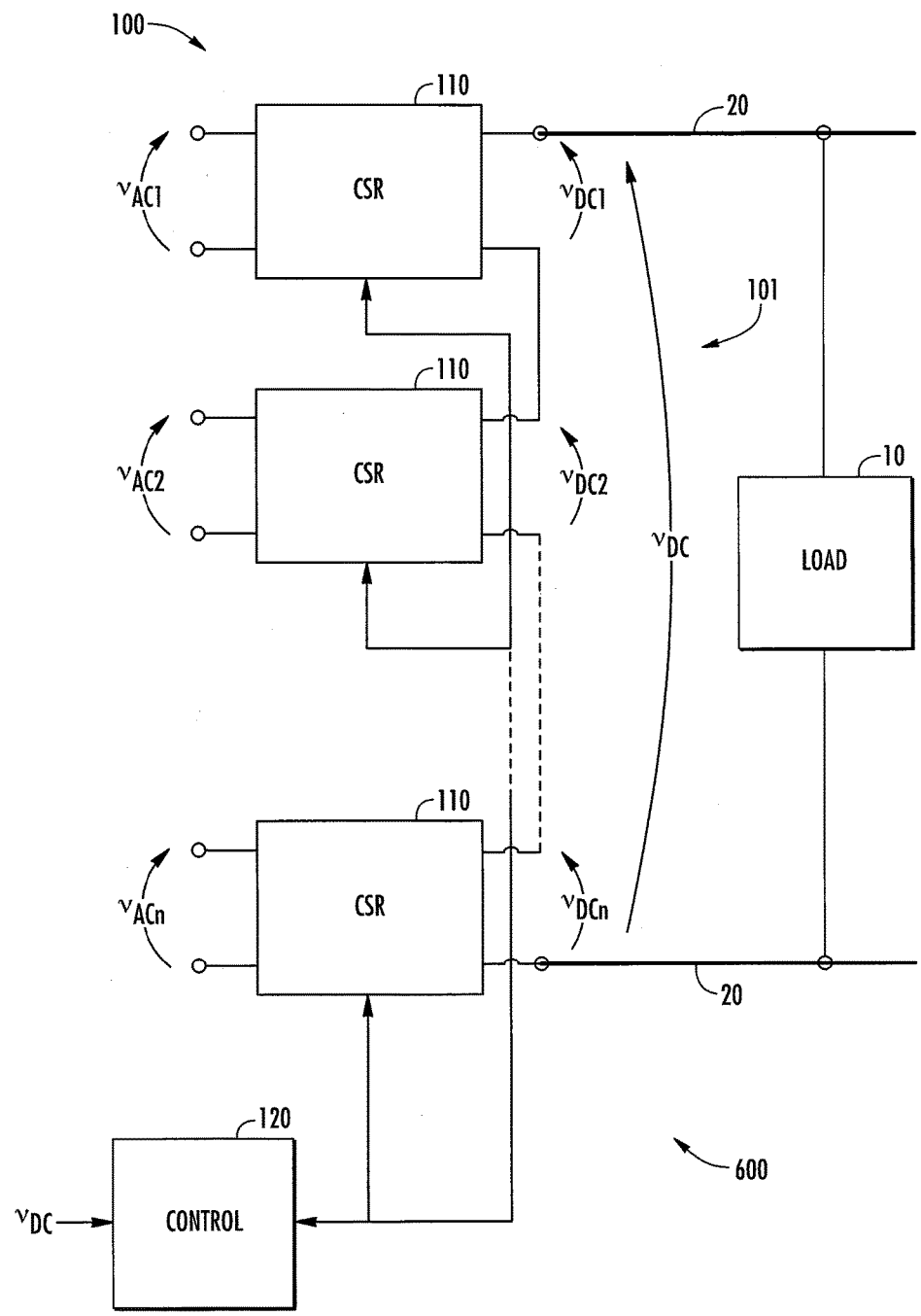
FIG. 1 is a schematic diagram illustrating a power converter apparatus using multiple serially connected current source rectifier circuits according to some embodiments of the and inventive subject matter.

Specific exemplary embodiments of the inventive subject matter now will be described with reference to the accompanying drawings. This inventive subject matter may, however, be embodied in many different forms and should not be construed as limited to the embodiments set forth herein; rather, these embodiments are provided so that this disclosure will be thorough and complete, and will fully convey the scope of the inventive subject matter to those skilled in the art. In the drawings, like numbers refer to like items. It will be understood that when an item is referred to as being "connected" or "coupled" to another item, it can be directly connected or coupled to the other item or intervening items may be present. As used herein the term "and/or" includes any and all combinations of one or more of the associated listed items.

The terminology used herein is for the purpose of describing particular embodiments only and is not intended to be limiting of the inventive subject matter. As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, items, and/or components, but do not preclude the presence or addition of one or more other features, integers, steps, operations, items, components, and/or groups thereof.

Unless otherwise defined, all terms (including technical and scientific terms) used herein have the same meaning as commonly understood by one of ordinary skill in the art to which this inventive subject matter belongs. It will be further understood that terms, such as those defined in commonly used dictionaries, should be interpreted as having a meaning that is consistent with their meaning in the context of the specification and the relevant art and will not be interpreted in an idealized or overly formal sense unless expressly so defined herein.

Some embodiments of the inventive subject matter arise from a realization that an AC to DC power converter with a high output voltage can be provided by series connecting the outputs of multiple current source rectifier units. Such a power converter apparatus may require only one stage of active power conversion to provide high efficiency in relation to conventional systems. Using current source rectifier circuits can simplify current limiting, allowing the use of simpler circuit breakers, as the breaker speed of response and peak current requirement may not need to be as great as needed a non-current limiting DC power supply. The DC output also can be increased in a controlled manner by incrementally activating the current source rectifiers, which can eliminate the need for pre-charge circuits at DC system loads. The individual current source rectifiers of the apparatus can regulate their output voltages independently. The current source rectifiers can also be controlled to provide a substantially sinusoidal AC input current waveform with low harmonic distortion. Power converter apparatus according to some embodiments may include redundant current source rectifiers to allow individual failed current source rectifiers to be shut down and bypassed while maintaining power delivery to the load using remaining active current source rectifiers. The overall input current harmonic distortion and or other input characteristics need not be degraded as individual current source rectifier units are bypassed.

FIG. 1 illustrates a power converter apparatus 100 according to some embodiments of the inventive subject matter. The power converter apparatus 100 includes a plurality of current source rectifier circuits 110 having outputs that are serially connected across an output port 101. One or more loads 10 may be connected to the output port 101 via one or more DC buses 20, which may be buses of a power distribution system including the power converter apparatus 100. The current source rectifier circuits 110 are configured to receive respective AC input voltages $v_{AC1}$, $v_{AC2}$, . . . , $v_{ACN}$ and produce respective DC output voltages $v_{DC1}$, $v_{DC2}$, . . . , $v_{DCN}$. A control circuit 120 is configured to control the current source rectifier circuits 110 responsive to a voltage $v_{DC}$ across the serially connected outputs of the current source rectifier circuits 110.

It will be appreciated that FIG. 1 is a conceptual illustration, and that power converter apparatus according to embodiments of the inventive subject matter may be implemented in a variety of different ways. For example, the AC input voltages $v_{AC1}$, $v_{AC2}$, . . . , $v_{ACN}$ may be single phase or multiphase (e.g., three phase) AC input voltages, and the current source rectifier circuits 110 may be single phase or multiphase circuits. The AC input voltages $v_{AC1}$, $v_{AC2}$, . . . , $v_{ACN}$ may be provided from a single source (e.g., a utility source or a local generator) or from multiple sources. Such AC power may be provided directly or via one or more transformers. The one or more DC buses 20 may comprise, for example, cables, bus bars, or similar conductors that serve a single load, or buses of a plurality of such conductors configured in a network that distributes power to a plurality of different loads via multiple branches. It will be appreciated that such a network may include additional devices, such as switches and circuit breakers.

Figure 2:
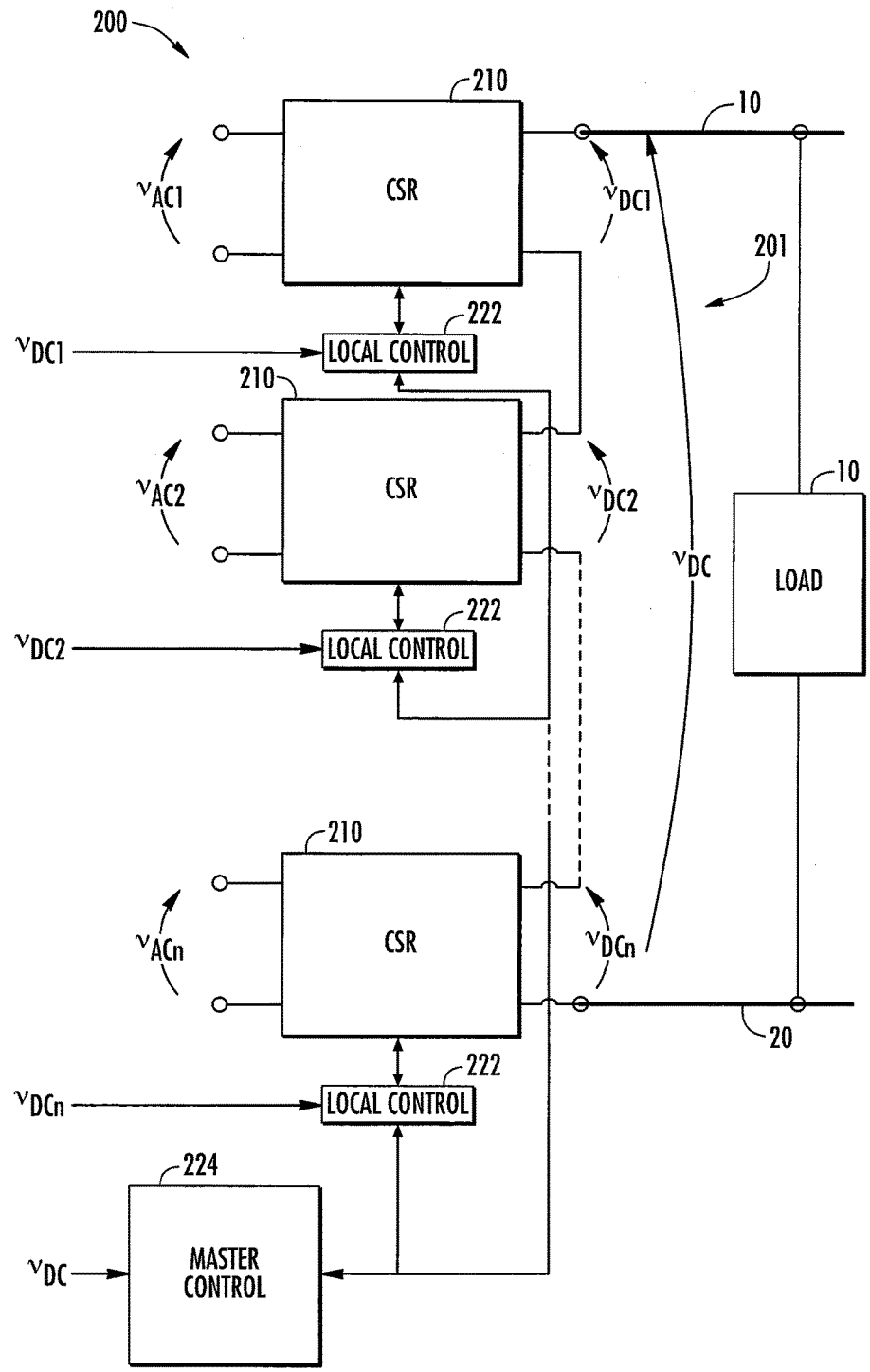
FIG. 2 is a schematic diagram illustrating a power converter apparatus according to further embodiments of the inventive subject matter.

FIG. 2 illustrates an example of a control circuit arrangement for a power converter apparatus 200 including a plurality of current source rectifier circuits 210 serially connected across and output port 201 according to further embodiments. A power converter apparatus 200 includes respective local control circuits 222 that are configured to control respective ones of the current source rectifier circuits 210. The local control circuits 222 may, for example, control switching devices (e.g., transistors) in the current source rectifier circuits 210 to regulate the respective DC voltages $v_{DC1}$, $v_{DC2}$, . . . , $v_{DcN}$ produced by the current source rectifier circuits 210. The local control circuits 222 may be configured to control the respective current source rectifier circuits 210 to conform to voltage control signals provided by a master control circuit 224. The master control circuit 224 may generate the voltage control signals responsive to the output voltage vDC produced by the aggregate combination of the current source rectifier circuits 210.

Figure 3:
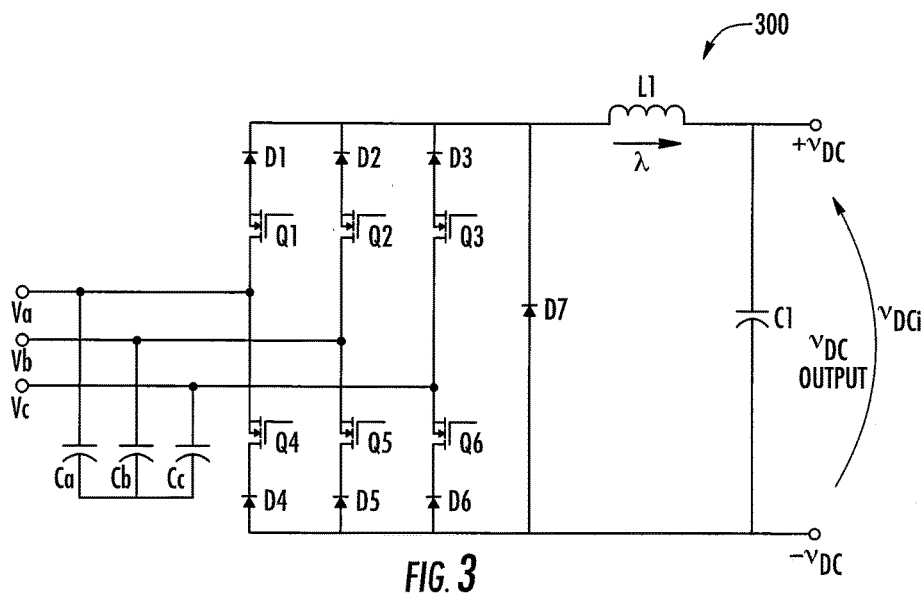
FIG. 3 a schematic diagram illustrating a current source rectifier circuit for the apparatus of FIGS. 1 and 2.

FIG. 3 illustrates an example of a current source rectifier circuit 300 which may be used as a constituent current source rectifier circuit for the power converter apparatus illustrated in FIG. 1 and FIG. 2. The current source rectifier circuit 300 is configured to receive a three-phase AC input and includes three half-bridge circuits including transistors Q1, Q2, Q3, Q4, Q5, Q6 and diodes D1, D2, D3, D4, D5, D6, an inductor L1, a storage capacitor C1 and a freewheeling diode D7. The transistors Q1, Q2, Q3, Q4, Q5, Q6 may be modulated to produce an output voltage $v_{DCi}$.

Figure 4:
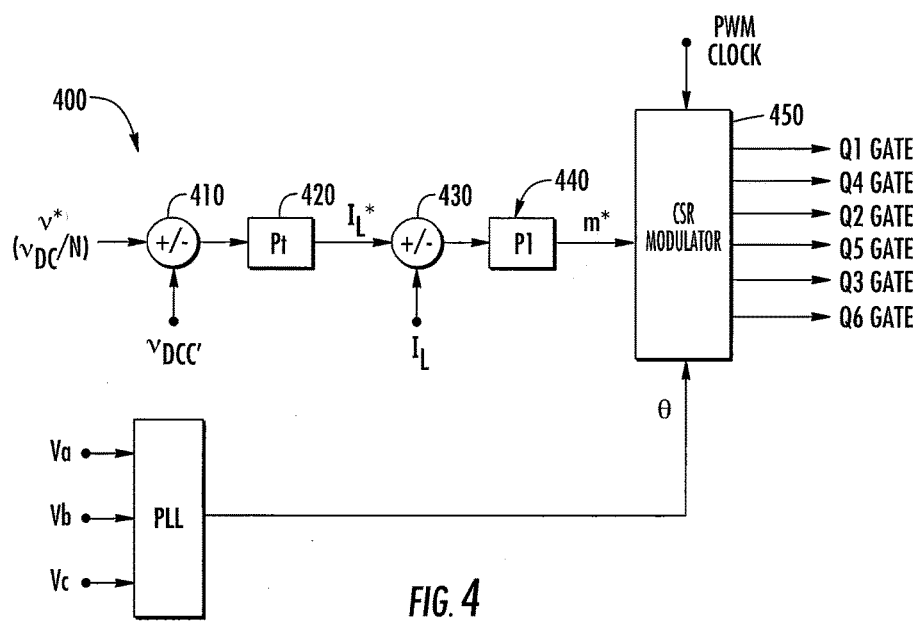
FIG. 4 is a schematic diagram illustrating a control circuit for the current source rectifier of FIG. 3.

FIG. 4 illustrates a local control circuit 400 which may be used to control the current source rectifier circuit 300 of FIG. 3. The control circuit 400 includes a summing circuit 410 configured to compare the output voltage vDCi of the current source rectifier circuit 300 to a voltage reference command signal v* that corresponds to the aggregate output voltage $v_{DC}$ (see FIG. 2) divided by the number of current source rectifier circuits N. An error signal produced by the summing circuit 410 is provided to a proportional integrator (PI) 420, which produces a current command signal $I_L$*. In a second summing circuit 430, the current command signal $I_L$* is compared to a signal representing the inductor current $I_L$ flowing through the inductor L1. An error signal produced by the second summing circuit 430 is provided to a second proportional integrator 440 that produces a modulation command signal m*. Responsive to the modulation command signal m*, a CSR modulator circuit 450 generates gate control signals that are applied to the transistors Q1, Q2, Q3, Q4, Q5, Q6 of the current source rectifier circuit 300. The gate control signals may be, for example, pulse width modulated signals synchronized to a pulse width modulation clock signal. The control circuit 400 may further include a phase locked loop (PLL) circuit 460, which produces a phase reference signal θ that may be used by the CSR modulator circuit 452 control the gate drive signals in a manner that controls the input current to provide a desired input current waveform (e.g., a desired power factor and/or harmonic content). The voltage reference command signal v* may be produced by a master control circuit based on the aggregate output voltage $v_{DC}$ (see FIG. 2).

It will be understood that the control circuit 400 may be implemented in any of a variety of different ways. Generally, the control circuit 400 may be implemented in any of a variety of different analog and/or digital circuits. For example, the summing circuits 410, 430, the proportional integrator circuits 420, 440, and the CSR modulator circuit 450 may be implemented using a data processing device, such as a microcontroller, along with associated peripheral circuitry. It will be appreciated, however, that such control elements may be provided by analog circuitry in other embodiments. It will be further appreciated that current source rectifier circuits other than the current source rectifier circuit 300 illustrated in FIG. 3 may also be used.

Figure 5:
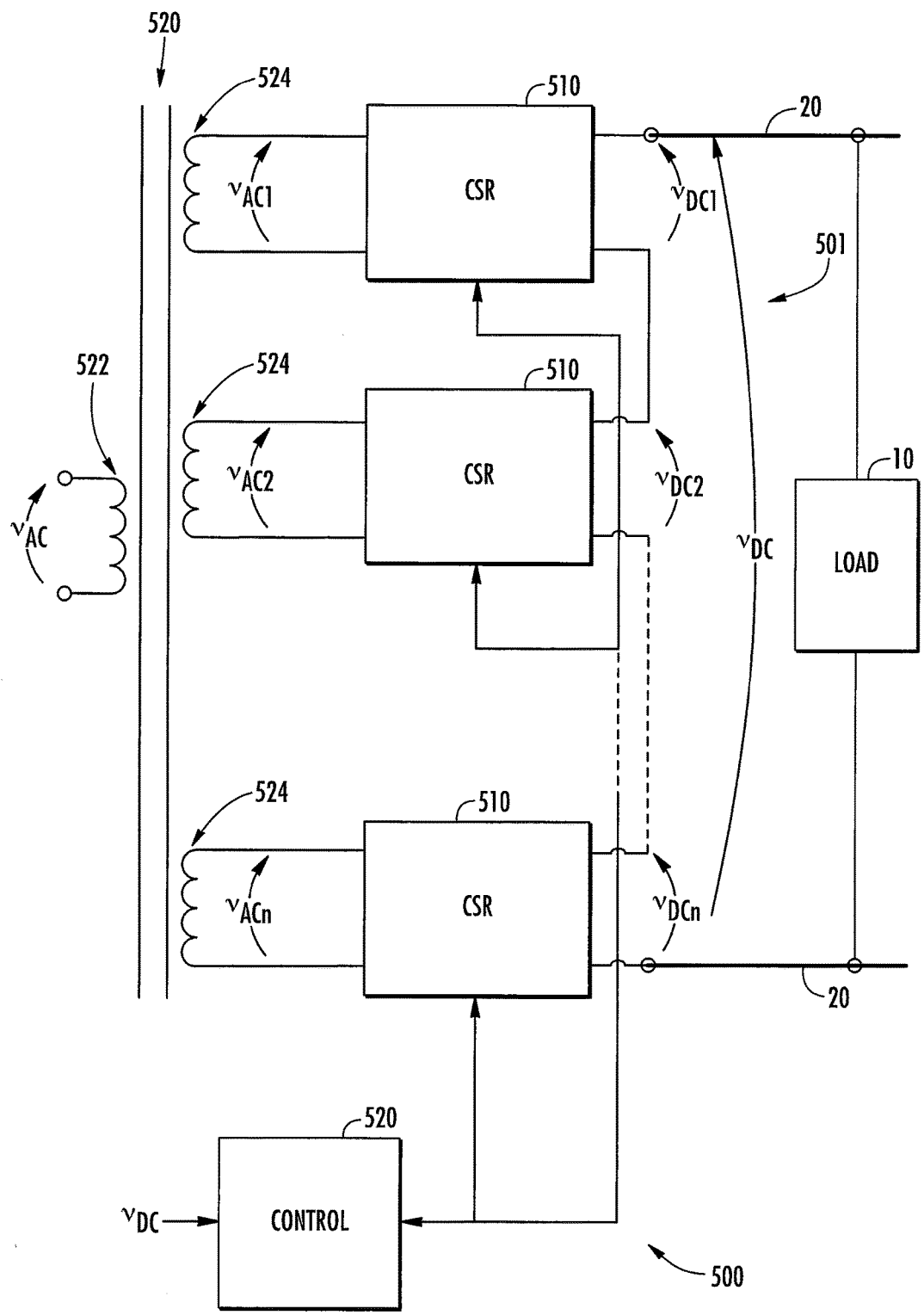
FIG. 5 is a schematic diagram illustrating a power converter apparatus with a multi-winding input transformer according to further embodiments of the inventive subject matter.

FIG. 5 illustrates a configuration that provides isolation of the AC inputs of serially connected current source rectifier circuits. In particular FIG. 5 illustrates a power converter apparatus 500 including a plurality of current source rectifier circuits 510 having outputs coupled in series across a load 10. The current source rectifier circuits 510 are fed by a transformer 520 including a primary winding 522 configured to be coupled to an AC power source and a plurality of secondary windings 524, respective ones of which are coupled to inputs of the current source rectifier circuits 510 and which are magnetically coupled to the primary winding 522 by a common magnetic core. The transformer 520 and the current source rectifier circuits 510 may be single or multiphase circuits. A control circuit 530 controls the current source rectifier circuits 510 as described above. It will be appreciated that other arrangements may be used, such as arrangements in which current source rectifier circuits are coupled to an AC source using individual transformers.

Figure 6:
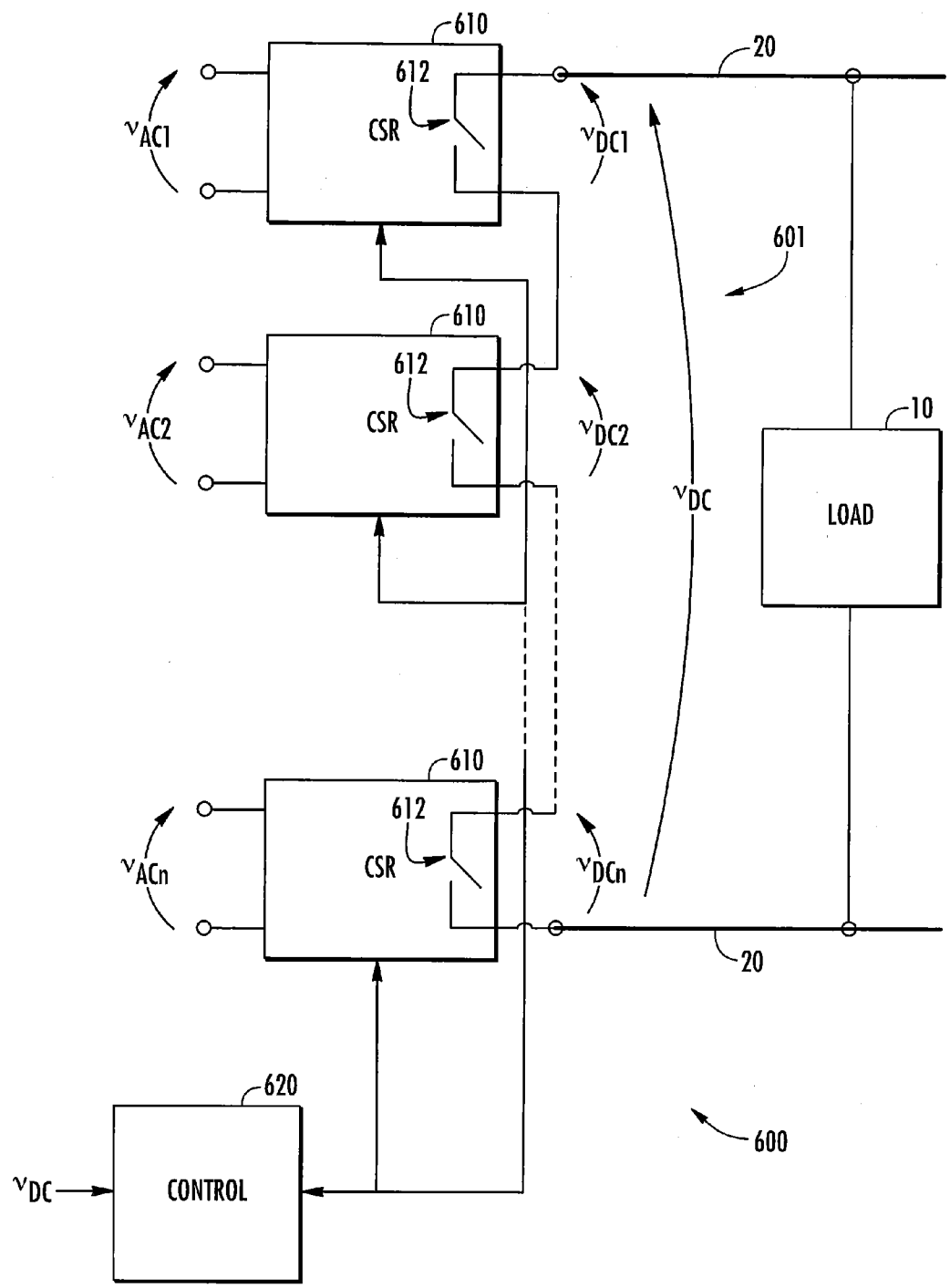
FIG. 6 is a schematic diagram illustrating a power converter apparatus with bypass switching functionality according to some embodiments of the inventive subject matter.

According to further embodiments of the inventive subject matter, a power converter apparatus including multiple serially connected current source rectifier circuits as described above may include a sufficient number of current source rectifier circuits to provide redundancy such that power may continue to be delivered to a load even when one or more of the constituent current source rectifier circuits has failed. For example, FIG. 6 illustrates a power converter apparatus including multiple current source rectifier circuits 610 coupled in series across a load 10 and controlled by a control circuit 620. The current source rectifier circuits 610 may include bypass circuitry, such as switches 612 (e.g., mechanical and or solid-state switching devices), which may be used to bypass individual failed ones of the current source rectifier circuits 610. When a failed one of the current source rectifier circuits 610 is bypassed by its accompanying switch 612, the control circuit 620 may adjust output voltages produced by remaining ones of the current source rectifier circuits 610 to maintain a desired output voltage.

Figure 7:
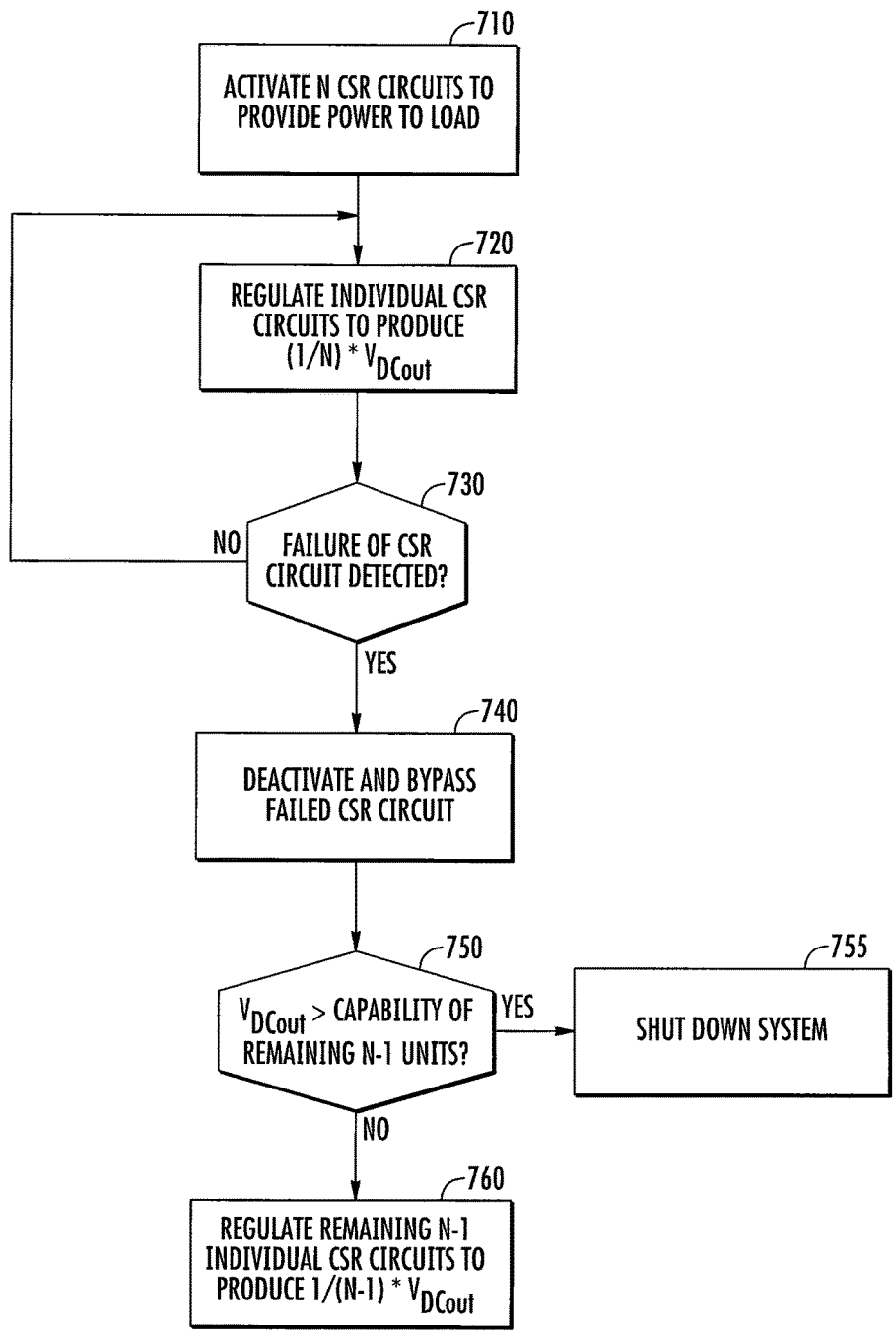
FIG. 7 is a flowchart illustrating operations of the power converter apparatus of FIG. 6 according to further embodiments of the inventive subject matter.

FIG. 7 illustrates exemplary operations for providing redundancy in a power converter apparatus such as that illustrated in FIG. 6. Initially, N current source rectifier circuits may be activated to provide power to the load 10 (block 710). Individual ones of the current source rectifier circuits may be commanded to produce respective output voltages that correspond to the desired aggregate output voltage divided by N (block 720). Upon detecting failure of a current source rectifier circuit, the master control circuit may deactivate and bypass the failed current source rectifier circuit (block 740). If the aggregate output voltage capability of the remaining serially connected N−1 current source rectifier circuits is greater than or equal to the desired DC output voltage plus a predetermined margin Δ, the remaining N−1 current source rectifier circuits may be adjusted to individually produce output voltages that correspond to the desired output voltage divided by N−1 (blocks 750, 760). Because of the use of current source rectifier circuits, control of the AC input current waveform need not degrade even though fewer current source rectifier circuits are being used. If the aggregate output voltage capability of the remaining N−1 current source rectifier circuits is insufficient to maintain the desired output voltage, the system may be, for example, shut down (blocks 750, 755).

In the drawings and specification, there have been disclosed exemplary embodiments of the inventive subject matter. Although specific terms are employed, they are used in a generic and descriptive sense only and not for purposes of limitation, the scope of the inventive subject matter being defined by the following claims.

That which is claimed:

1. An apparatus comprising:
an output port configured to be coupled to a load;
a plurality of current source rectifier (CSR) circuits having outputs coupled in series across the output port; and
a control circuit configured to control the CSR circuits responsive to a voltage at the output port and further configured to sense a failure of one of the CSR circuits and to responsively bypass the failed one of the CSR circuits and adjust output voltages of remaining active ones of the CSR circuits to maintain a desired output voltage at the output port.

2. The apparatus of claim 1, wherein the control circuit comprises:
a master controller configured to generate a plurality of voltage control signals responsive to the voltage at the output port; and
a plurality of local controllers configured to control respective ones of the CSR circuits responsive to respective ones of the voltage control signals.

3. The apparatus of claim 2, wherein the voltage control signals represent desired output voltages for the respective CSR circuits.

4. The apparatus of claim 3, wherein the desired output voltages represented by the voltage control signals correspond to a desired level for the voltage at the output port divided by a number the CSR circuits serving a load coupled to the output port.

5. The apparatus of claim 2, wherein the master controller is configured to sense the failure of the failed CSR circuit and to responsively bypass the failed CSR circuit and adjust output voltages of the remaining active ones of the CSR circuits to maintain a desired output voltage at the output port.

6. The apparatus according to claim 2, wherein the local controllers are configured to be powered at respective voltages applied to inputs of the associated CSR circuits.

7. The apparatus of claim 1, wherein inputs of the CSR circuits are isolated from one another.

8. The apparatus of claim 7, further comprising a transformer having a primary winding configured to be coupled to an AC power source and a plurality of secondary windings, respective ones of which are coupled to respective ones of the inputs of the CSR circuits.

9. A power distribution system comprising the apparatus of claim 1 coupled to at least one load via at least one power distribution bus.

10. A power distribution system comprising:
   at least one DC power distribution bus configured to provide power to at least one load; and
   a power converter having an output port coupled to the at least one DC power distribution bus, the power converter comprising:
      a plurality of CSR circuits having outputs coupled in series across the output port;
      a master controller configured to generate a plurality of voltage control signals responsive to the voltage at the output port; and
      a plurality of local controllers configured to control respective ones of the CSR circuits responsive to respective ones of the voltage control signals,
      wherein the master controller is configured to sense a failure of a CSR circuit and to responsively deactivate the failed CSR circuit and adjust output voltages of remaining active ones of the CSR circuits to maintain a desired output voltage at the output port.

11. The power distribution system of claim 10, wherein the CSR circuits are provided in a quantity that provides redundancy sufficient to maintain the load in the event of deactivation of at least one of the CSR circuits.

12. The power distribution system of claim 11, wherein the power converter further comprises a transformer having a primary winding coupled to an AC power source and a plurality of secondary windings, respective ones of which are coupled to respective ones of the inputs of the CSR circuits.

13. A method comprising:
   coupling outputs of a plurality of CSR circuits in series across a load; and
   controlling the CSR circuits responsive to a voltage across the serially-coupled outputs of the CSR circuits;
   detecting a failure of a CSR circuit; and
   responsively deactivating the failed CSR circuit and adjusting output voltages of remaining active ones of the CSR circuits to maintain a desired output voltage at the output port.

14. The method of claim 13, wherein the quantity of the CSR circuits provides redundancy sufficient to maintain the load in the event of deactivation of at least one of the CSR circuits.

15. The method of claim 13, wherein controlling the CSR circuits responsive to a voltage across the serially-coupled outputs of the CSR circuits comprises controlling the CSR circuit using a master controller configured to generate a plurality of voltage control signals responsive to the voltage at the output port and a plurality of local controllers configured to control respective ones of the CSR circuits responsive to respective ones of the voltage control signals.

16. The method of claim 13, wherein controlling the CSR circuits is preceded by:
   coupling a primary winding of a transformer to an AC power source; and
   coupling respective secondary windings of the transformer to inputs of respective ones of the CSR circuits.

* * * * *

UNITED STATES PATENT AND TRADEMARK OFFICE
CERTIFICATE OF CORRECTION

PATENT NO. : 10,027,112 B2
APPLICATION NO. : 14/748963
DATED : July 17, 2018
INVENTOR(S) : Slobodan Krstic Page 1 of 1

It is certified that error appears in the above-identified patent and that said Letters Patent is hereby corrected as shown below:

In the Claims

Column 7, Line 30, Claim 12, please delete "the" before "inputs."
Column 8, Line 3, Claim 13, please delete "and" after "load."

Signed and Sealed this
Twenty-fifth Day of September, 2018

Andrei Iancu
*Director of the United States Patent and Trademark Office*